Dec. 14, 1965 G. W. MISSON 3,223,500
GAS MODULE SYSTEMS FOR HEAT TRANSFER AND/OR FLUID
SUPPORT OF GLASS OR OTHER SHEET MATERIALS
Filed Nov. 7, 1962 7 Sheets-Sheet 1

FIG. 1

INVENTOR.
GEORGE W. MISSON
BY
Oscar L. Spencer
ATTORNEY

INVENTOR.
GEORGE W. MISSON

Dec. 14, 1965 G. W. MISSON 3,223,500
GAS MODULE SYSTEMS FOR HEAT TRANSFER AND/OR FLUID
SUPPORT OF GLASS OR OTHER SHEET MATERIALS
Filed Nov. 7, 1962 7 Sheets-Sheet 4

INVENTOR.
GEORGE W. MISSON
BY Oscar H. Spencer
ATTORNEY

Dec. 14, 1965 G. W. MISSON 3,223,500
GAS MODULE SYSTEMS FOR HEAT TRANSFER AND/OR FLUID
SUPPORT OF GLASS OR OTHER SHEET MATERIALS
Filed Nov. 7, 1962 7 Sheets-Sheet 5

INVENTOR.
GEORGE W. MISSON
BY
Oscar L. Spencer
ATTORNEY

INVENTOR.
GEORGE W. MISSON
BY
Oscar L. Spencer
ATTORNEY

Dec. 14, 1965  G. W. MISSON  3,223,500
GAS MODULE SYSTEMS FOR HEAT TRANSFER AND/OR FLUID
SUPPORT OF GLASS OR OTHER SHEET MATERIALS
Filed Nov. 7, 1962  7 Sheets-Sheet 7

FIG. 14

INVENTOR.
GEORGE W. MISSON
BY
Oscar L. Spencer
ATTORNEY

United States Patent Office 3,223,500
Patented Dec. 14, 1965

3,223,500
GAS MODULE SYSTEMS FOR HEAT TRANSFER AND/OR FLUID SUPPORT OF GLASS OR OTHER SHEET MATERIALS
George W. Mission, Pittsburgh, Pa., assignor to Pittsburgh Plate Glass Company, Pittsburgh, Pa., a corporation of Pennsylvania
Filed Nov. 7, 1962, Ser. No. 236,036
6 Claims. (Cl. 65—25)

The invention is an improvement over the inventions claimed and/or disclosed in the following U.S. patent applications of James C. Fredley and George E. Sleighter: applications Serial Nos. 31,572, filed May 25, 1960, now abandoned; 139,901, 139,902, and 140,135, all filed September 22, 1961 and all now abandoned; 172,235, filed February 9, 1962; 175,938 and 176,050 both filed February 27, 1962 and both now abandoned; 178,997 filed March 12, 1962; 185,448, filed April 5, 1962; 185,757, filed April 6, 1962, now abandoned; 195,773 filed May 18, 1962; 209,456, filed July 12, 1962, now abandoned; 236,103, filed November 7, 1962, now abandoned; and 236,676, filed November 9, 1962.

This invention relates to a system for supplying fluid in heat exchange relationship and/or in supporting relationship to a sheet or ribbon of glass or other sheet material. The support system is particularly adapted for handling hot glass or other heat deformable material in sheet or ribbon form without marring or otherwise producing uncontrolled deformation in the major surfaces, even when the glass or other material is at a deformation temperature.

In the fabrication of glass through known manufacturing techniques of bendng, tempering, annealing or coating and combinations of such techniques to form end-products having characteristics and uses different from the original product, it is necessary to heat the glass sheet to a temperature above that at which the major surfaces or the contour thereof will be changed by deforming stress or contact with solids. Where it is desired to strengthen the glass, it is further necessary to rapidly cool the glass sheets from such a deformation temperature to a lower temperature below the annealing range of the glass. The effectiveness of such strengthening is enhanced by an increase in the rate at which heat is removed from the surfaces with respect to the center of the glass sheet.

Economic utilization of fabricating equipment requires that the glass sheets undergoing treatment be conveyed while hot. The necessity of conveying glass at high temperature has heretofore resulted in undesirable deformation or marring of the major surfaces of glass sheets being treated due to physical contact with supporting and conveying apparatus while the glass is at elevated temperatures. The instant invention overcomes this defect common to known methods of treating glass sheets and at the same time provides an effective means of transferring heat to or from the glass.

More specifically, methods and apparatus have been devised for effectively transferring heat between a film of gas and the major surfaces of a glass sheet in contact therewith where the gas is at a different temperature from that of the glass. When the glass is at or above a temperature at which it will deform by viscous flow, heat transfer is most advantageously accomplished while the sheets of glass are supported on a film of the gas, thereby eliminating the necessity of contacting the major surfaces of the glass sheet with any solid object while the glass is subject to deformation or impairment. For satisfactory results, the film of gas must uniformly support the glass against undesired deformation. By processing glass in this manner, the marring or distorting now associated with current flat glass fabricating processes is eliminated and effective heating or cooling of the glass sheets is achieved.

In addition to the above, the instant invention, through more efficient and uniform heat transfer, has substantially eliminated the irregular iridescent strain pattern characteristic of tempered glass and has provided a means of fully tempering thinner glass to produce products of higher quality than has been possible under existing production processes.

In accordance with an embodiment of the invention, there is provided a plurality of evenly distributed zones of uniform nominal pressure on the lower side of the sheet adequate to support the sheet element undergoing treatment. Gas flow from a reservoir under higher pressure into such zones, being uniformly throttled between the reservoir and each zone to restrict the passage of gas between the two. Each zone constitutes a unit of support area with respect to the sheet to be supported, and each has a reference surface at its margins common to the remainder. Within each zone gas entering from the reservoir is diffused after throttling so as to avoid creation of localized jets normal to the reference surface and otherwise to equalize pressure and flow under normal conditions of operation. Provision is made for escape of the flow of gas emanating from each zone when covered by glass. In operation, the rate of flow of gas from the reservoir to each zone is maintained at such level that the average clearance between the reference surface and the glass sheet being supported is not less than 0.001 inch and usually not greater than 0.050 inch, normally not greater than 0.025 inch for glass having a thickness of $3/32$ inch and above, and in any case never more than 50 to 90 percent of the thickness of the supported glass.

The invention contemplates a gas support system in which glass is introduced onto the support area at a temperature below that at which its major surfaces will mar on physical contact with solid objects, the glass is heated above deformation temperature while supported primarily by gas and is then cooled until below deformation temperature before removal from the gas support. The system is particularly well adapted to heating flat glass in the form of sheets or the like in which the thickness ranges up to ½ to one inch and the length and breadth of the sheet generally are over 6 inches or one foot to as much as 5 or 10 feet or greater, optionally bending it during travel over a curved bed, then rapidly cooling the surfaces or quenching by utilizing relatively cold gas as the support medium, supplementing the cooling effect on the supported side by complementary flow of cold gas against the opposite side to equalize the heat transfer from the two major surfaces until the entire body is cool enough to prevent loss of temper or, in other words, redistribution of the stress, differential set up between the surfaces and the interior of the glass body by differential rates of cooling.

To better accomplish the above, and in accordance with several embodiments of this invention, improved methods and apparatus have been devised for emitting a flow of gas in heat transfer and supporting relationship with glass sheets to be treated. To this end, a plurality of closely adjacent sub-divided gas emitting chambers or modules has been provided, the outer termini of which lie along a common generative surface closely adjacent to the major surfaces of the sheets to be treated and, advantageously, the chambers may provide a fluid support bed for the glass sheets. Each subdivision of the chambers is separated from the next by a gas impervious barrier and a separate flow of gas is supplied to each subdivision. The gas is diffused within the subdivisions, emitted therefrom adjacent a major surface of the sheet being treated, and then exhausted from the zone adjacent the sheet through channels between the subdivided chambers at the generative surface.

Where it is desired to heat glass sheets in the above manner, hot gas may advantageously be supplied by burning a controlled admixture of gas and air and introducing the hot products of combustion to a reservoir or plenum chamber which supplies the gas to pressure zones adjacent the glass sheet. Heat may be supplied equally to each major surface of the glass sheet by placing a module bed adjacent each side thereof. Alternatively, a single module bed may be used beneath the glass sheets to provide a fluid support which effectively heats the lower, supported surface, and supplemental radiant heat may be supplied from independently controlled sources disposed on the side of the glass opposite the supported side.

Gas utilized for cooling glass sheets in the manner above described is most advantageously obtained at ambient temperatures from the surrounding atmosphere.

The attendant advantages of this invention and the various embodiments thereof will be readily appreciated as the same become better understood by reference to the following detailed description when considered in connection with the accompanying drawings in which.

Figure 1:
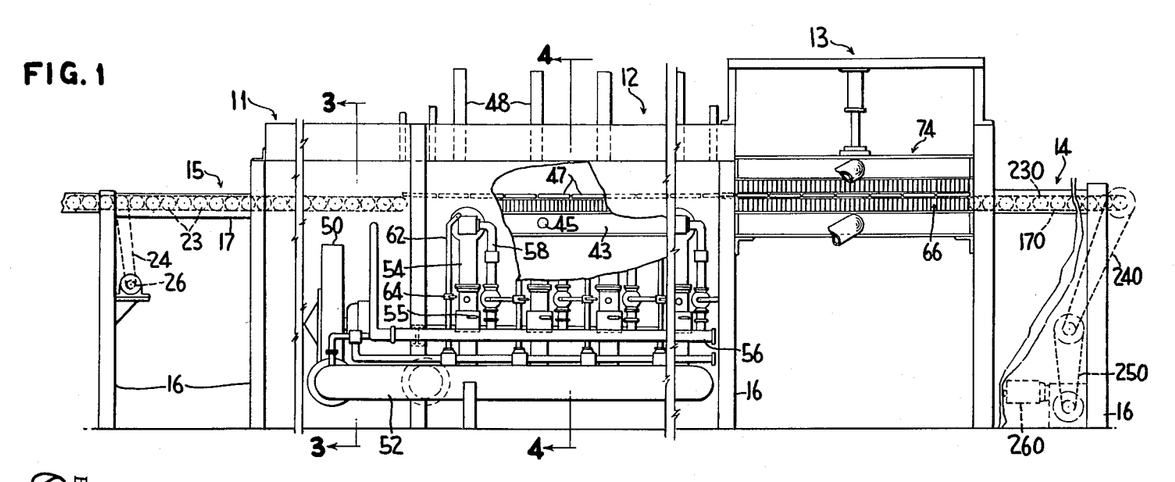
FIG. 1 is a side elevational view of a system for conveying, heating and quenching sheets of glass.
Figure 2:
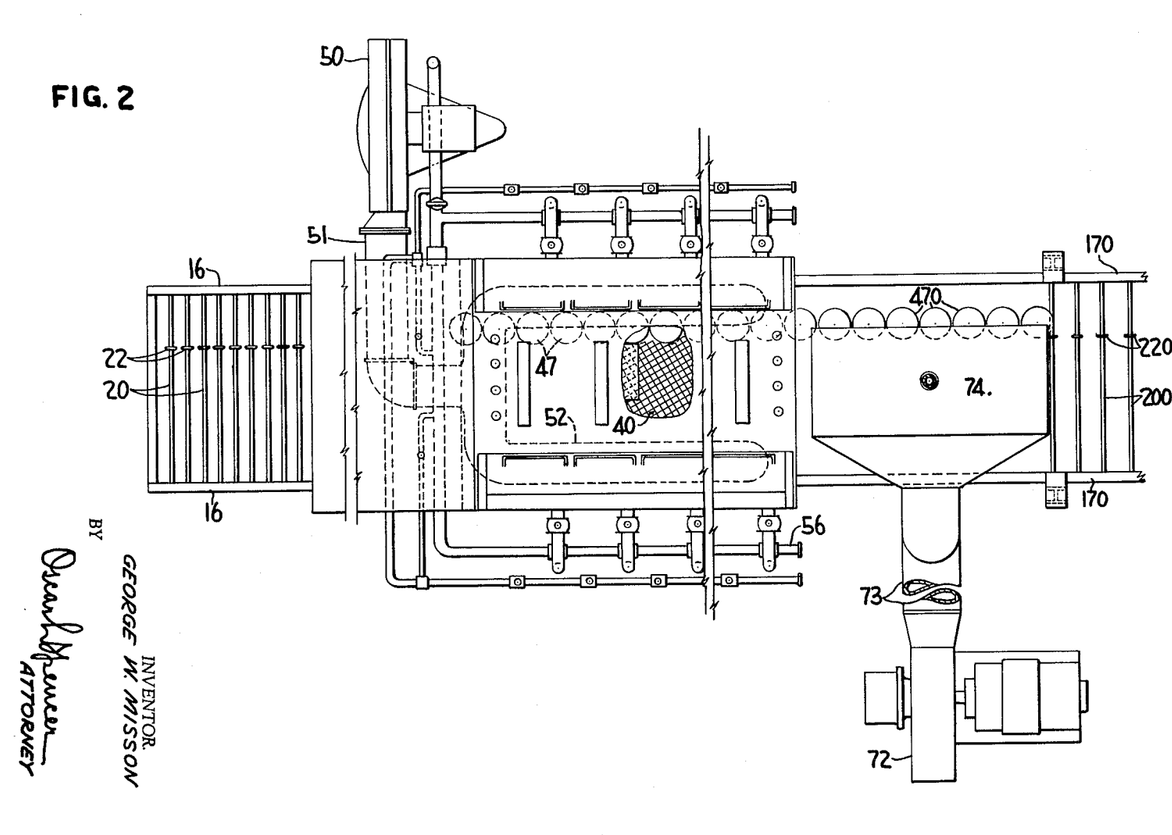
FIG. 2 is a plan view of the system of FIG. 1.
Figure 3:
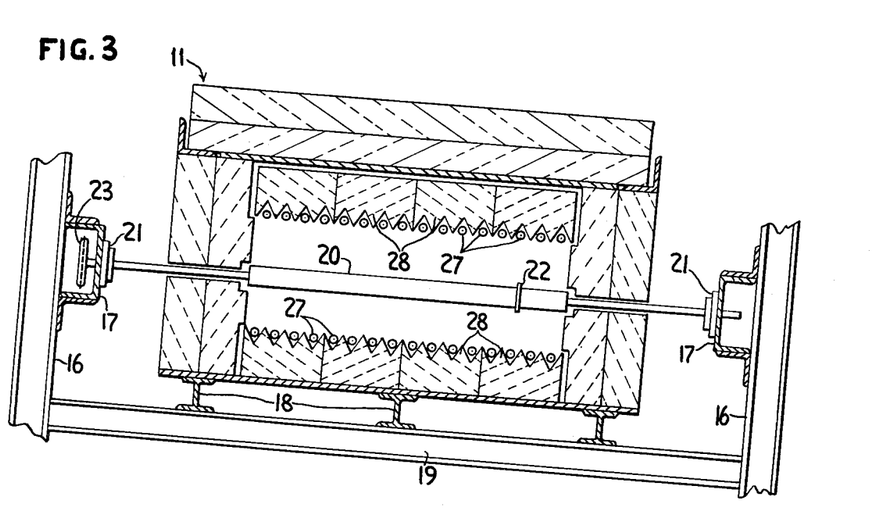
FIG. 3 is a detailed view in section taken along the lines 3—3 of FIG. 1.
Figure 4:
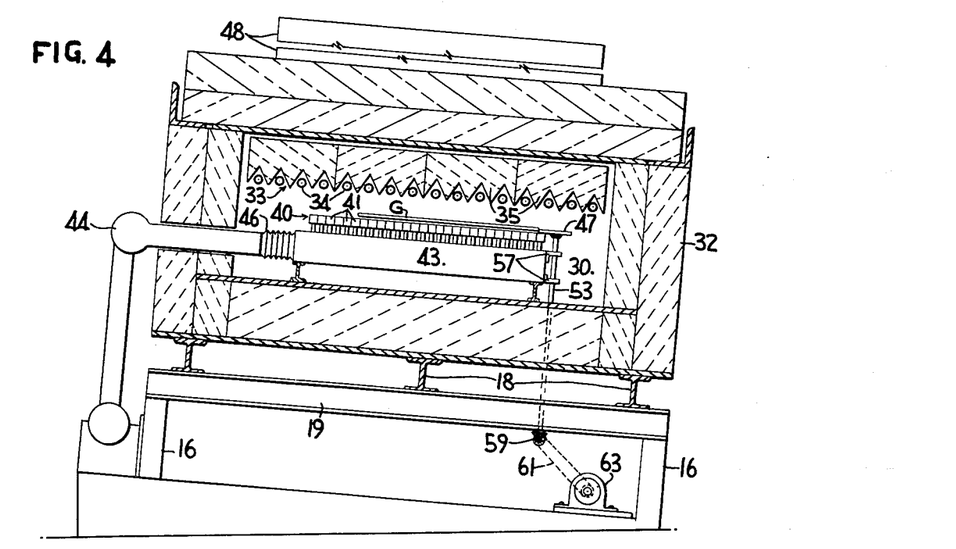
FIG. 4 is a detailed view in section, partially schematic, taken along the lines 4—4 of FIG. 1.

FIGS. 1–4 illustrate a system advantageously employed for heating flat glass parts up to or above the deformation temperature, e.g., to a temperature at which the glass can be tempered or at which a coating thereon will be heat-cured, quenching such parts while hot and delivering the parts thus tempered onto a roll conveyor for removal. The component sections making up the complete system consist of a preheat section 11 wherein the glass is conveyed on rollers between radiant heaters to preheat the glass until brought to a suitable preheat temperature under the deformation temperature; heating section 12 where the glass parts are transferred to and supported on a film of hot gas while being conveyed through a frictional drive contacting the edges only of such parts, heat being supplied by the supporting gas and radiant heat sources above the glass until the glass reaches a temperature high enough for processing; a quenching section 13 where the glass is rapidly chilled while suspended between opposed flowing films of cool air, edge contact driving being continued through the section; and a delivery section 14 which receives the processed parts and conveys them to their next destination. Associated with the preheat section 11 is an apron roll unit 15 for loading. The essential framework of the apparatus consists of stanchions 16, channel members 17 and 170, girders 18 and cross beams 19. The framework is constructed to provide a common plane of support for the glass which is tilted in a sidewise direction at an angle of five degrees with respect to the horizon, as shown in FIGS. 3 and 4.

As illustrated in FIGS. 1–4, a plurality of conveyor rolls 20 of preheat section 11 are suitably journaled at each end in bearings 21 mounted on the parallel channels 17. The rolls are tilted transversely of the path of glass travel and are provided with guide collars 22 to position the glass properly for transfer to the heating section. Rolls 20 are driven by attached sprockets 23 through chains 24 and 25 by electric motor 26. Included in the preheat section are a radiant floor and a radiant roof consisting of heating coils 27 disposed in ceramic holders 28. Control is afforded so that the radiant floor and roof may be regulated as to temperature across the path of travel and longitudinally thereof. Thermocouples (not shown) sense the temperature of the preheat section and the glass to actuate the heating coils to the extent necessary to supply the required amount of heat.

Heating section 12 (FIGS. 1, 2 and 4) includes within the supporting framework, previously mentioned, a furnace chamber 30 of insulating refractory walls 32 and a radiant roof 33 with heating coils 34 in ceramic holders 35.

As shown in FIGS. 1, 2 and 4, the furnace chamber 30 includes a flat bed 40 of modules 41 in spaced but close juxtaposition, each to the other, and arranged geometrically like a mosaic. In the embodiment illustrated, all modules 41 have their upper termini of rectangular configuration and lying in a common plane. The modules 41 are arranged in successive rows crossing the intended path of travel of the workpiece, each row being at an angle other than 90 degrees from the path and spaced close to the next adjacent row.

Each module 41 has a stem 42 of smaller cross sectional area than the upper terminus and each opens into a plenum chamber 43 positioned below the bed 40 and acting as a support therefor. See FIGS. 4 and 6. Each module consists of an open-ended chamber subdivided into smaller chambers which are independently supplied with gas. Each module is substantially enclosed and separated from the other modules by an exhaust zone. The bed is adjusted to such level that the plane of the upper termini of the modules lies parallel to, but just below, by approximately the height of the gap between modules and the support height of the glass sheet, the plane defined by the upper surfaces of the conveying rolls 20 of preheat section 11. Gas burners 44 communicate with plenum chambers 43 through orifices 45 and flexible couplings 46 at one side thereof. At the opposite and lower side of the bed 40, a series of uniform disc-like driving members 47 extend inwardly and just above the bed to frictionally engage one edge only of the workpiece and convey it along the bed in continuous straight line travel. Drive members 47 (FIGS. 2 and 3) are mounted on shafts 53 journaled for rotation in bearings 57. Each shaft 53 is geared to a drive shaft 59 extending longitudinally of the support bed and driven through chain 61 by electric motor 63 in a manner well known in the art. A plurality of vents 48 project through the roof of the heating section to exhaust the interior to the atmosphere. Spaced intermittently in the bed 40 inboard of its margins are exhaust ducts 49 (see FIGS 5 and 6) projecting through the floor of the plenum chamber 43 and communicating with the surrounding atmosphere in the furnace chamber, thus serving to reduce the likelihood of pressure buildup in the central spaces between the modules 41 during the time when a workpiece overlies any substantial area of the bed. In addition, an exhaust channel 77 surrounding the module stems and disposed between the modules and the plenum provides exhaust paths to the sides of the module bed and hence to the surrounding atmosphere.

To supply air under pressure to the hot gas support combustion system, a blower 50 is employed to feed air under pressure through a conduit 51 to a manifold 52. As best shown in FIG. 1, the individual burners 44 are supplied with air from manifold 52 through conduits 54, each provided with a valve 55. Combustible gas from a main 56 is introduced into each burner 44 by a conduit 58, each individually valved as at 60. Each burner 44 is of the so-called excess air burner type. Combustible gas is mixed with an excess of air within each burner and is ignited by a pilot burner supplied wth a pre-mxed supply of combustible through a conduit 62, valved as at 64.

The combustion of the products in the combustion chamber of the burner supplies the plenum chamber 43 with heated gas at a uniform temperature and pressure. Adequate control of pressure and temperature is provided by correlating the rates of input of air and fuel to the burners. To supply enough gas to effect the desired support under normal conditions, an excess of air over that required for the combustion of the fuel gas is used. The supply of gas may be varied to change the heat input, and the supply of both air and gas may be varied to change the pressure in the plenum. Hot fluid from the plenum chamber 43 escapes through nozzle outlets within the modules 41 to provide a supporting pressure for a glass plate in a manner which will later be explained in more detail.

Next adjacent the gas support heating section 12 in the direction of travel of the workpieces is quenching section 13. As shown best in FIGS. 1, 11 and 14, the quenching section 13 incldues a flat bed 66 of modules 67 arranged in a mosaic pattern similar to that of the gas film support heating bed but varying therefrom in certain respects, hereinafter explained in detail. Each module 67 has a long stem 68 smaller in cross section than the upper terminus which projects through a cooling box 70 into a plenum 71, the cooling box and upper surface of the plenum acting as a support for the modules. The surface of the upper termini of the modules is adjusted to such level that it lies at the same level and in the same contour as that of the end portion of the gas film heating bed next preceding.

Heat exchange fluid, such as cooling water, is circulated within cooling box 70 to cool the quench modules 66 and maintain the entire bed at a uniform temperature. Relatively cool gas, such as air at ambient temperature, is supplied to the plenum chamber 71 via blower 72 and duct 73 (see FIG. 2).

Above the bed 66 and supported in such fashion as to be capable of being raised and lowered is a head assembly 74 (FIG. 1) which, in essence, constitutes a mirror image of the bed 66 and its associated heat exchange box 70 and plenum chamber 71 and which, in turn, is supplied separately with heat exchange fluid and air in like manner.

By virtue of the air supplied to the upper and lower module beds of the quench section at a suitable rate of flow and pressure to support the glass sheets between opposing films of cool air, the glass is rapidly cooled while maintained out of physical contact with the supporting apparatus. Rotating drive discs 470 along the lower side of the quench section extend between the upper and lower module beds to frictionally engage one edge only of the gas supported sheets and convey them through the section in continuous straight line travel in the manner previously described in connection with the heating section.

As shown in FIGS. 1 and 2, delivery section 14 consists of conveyor rolls 200 provided with guide collars 220 in alignment with discs 470 of the quenching section to maintain the proper position of the glass during transfer therefrom. Each roll is journaled in bearings 210 supported on channels 170 and is driven by sprockets 230 through chains 240 and 250 by motor 260.

MODULE DESIGN

In accordance with an embodiment of this invention, highly developed and refined apparatus have been provided to suply gas in an efficient heat transfer relationship with a sheet of material, such as glass, and to support the sheet of material at a temperature above that at which it softens and deforms while preventing the distortion thereof. Specifically, and from the standpoint of supporting a glass sheet at deformation temperature without deforming the same, it is important to have a very large proportion of the glass sheet or plate supported by a uniform force. This prohibits flowing the supporting air film across substantial areas of a supporting plate (i.e., between such a plate and the supported glass) because of the creation thereby of a progressive pressure drop along the path of flow and hence a nonuniform supporting force. Furthermore, air introduced from a plurality of points beneath the supported glass must be exhausted beneath the supported area rather than merely by lateral flow to the glass edges to prevent a pressure buildup centrally of the supported sheet that will cause a doming effect upon the soft glass.

Of course, if the support zones are small in comparison with the exhaust areas, the support pressure will not be substantially uniform. If the exhaust areas are large in magnitude, thinner sheets of glass overlying these areas will have a tendency to sag. Conversely, if the support areas are too large and exhaust areas too small, doming of the glass tends to occur.

It is particularly important that the support be provided by a diffused and relatively small gas flow to provide substantially uniform pressure across the width of the support zone, thereby avoiding deformation, such as dimpling, from velocity pressure due to the direct impingement of localized jets of gas against the supported glass surface.

Finally, it has been found that distinct advantages are attained by dividing the pressure zones that are surrounded by exhaust zones into subdivisions that are individually supplied with fluid under pressure. The pressure profile across the module remains uniform and the added feature of independently functioning submodules is gained. Thus, when a glass sheet covers any one subdivision, that subdivision functions as an independent module and exerts pressure against the surface of the glass. In the absence of the subdivisions, fluid pressure is not exerted until substantially the entire module becomes covered. The subdivisions, therefore, provide a substantial increase in the area of uniform treatment and support along the edges of the sheet, which edges in most instances do not directly overlie or extend along the module walls. Furthermore, where sufficiently low flow rates are used to allow uniform pressure with a minimum of exhaust area, the concept of subdividing the pressure zone has permitted the utilization of larger pressure zones without sacrificing uniformity of edge treatment or edge support. The ability to utilize larger pressure zones permits considerable economies in the fabrication of equipment.

With respect to the heat transfer considerations of module design, it is important that the heating and cooling objectives be capable of accomplishment with relatively low gas flow rates. This is important from the standpoint of economics in a heating situation and is important from the standpoint of preserving surface quality of the material in both heating and cooling operations to prevent the distortion of the material, such as glass, when treated at deformation temperatures. It is pointed out, however, that the low flow rates must be accompanied by a high rate of heat transfer. This is not only desirable in the heating operation from the standpoint of reducing costs and lowering processing time but, in addition, is a sine qua non of the quenching operation for attaining high degrees of thermal temper in glass sheets, particularly in thinner sheets of glass. It has been found that a much increased rate of heat transfer can be obtained, notwithstanding relatively low rates of flow of the heating or cooling gas, by flowing a thin film of gas in contact with a glass sheet in a diffused and turbulent manner. This turbulence occurs as the gas flows from the pressure zones, through the narrow gaps between the outer termini of the module walls and the surface being treated, and thence to the exhaust zones of lower pressure. The turbulent flow assure high heat transfer by efficiently stripping off the adherent insulating boundary layer of gas molecules at the surface of the material being treated. Utilization of a thin but turbulent film of gas in the manner contemplated herein obviates the need for the many back up layers of gas needed in known convective heat transfer techniques to force the active or working molecules into heat transfer relationship with the surface being treated. This, in turn, permits low gas flow rates while attaining high rates of heat transfer. The highest rates of heat transfer occur in the zone directly opposite the gap between the outer termini of the module walls and partitions and the workpiece.

Figure 5:
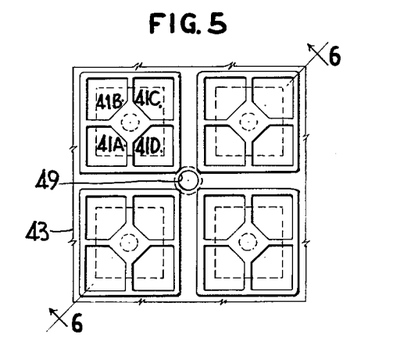
FIG. 5 is a partial plan view approximately full scale of a module bed illustrating one embodiment of a subdivided module.
Figure 6:
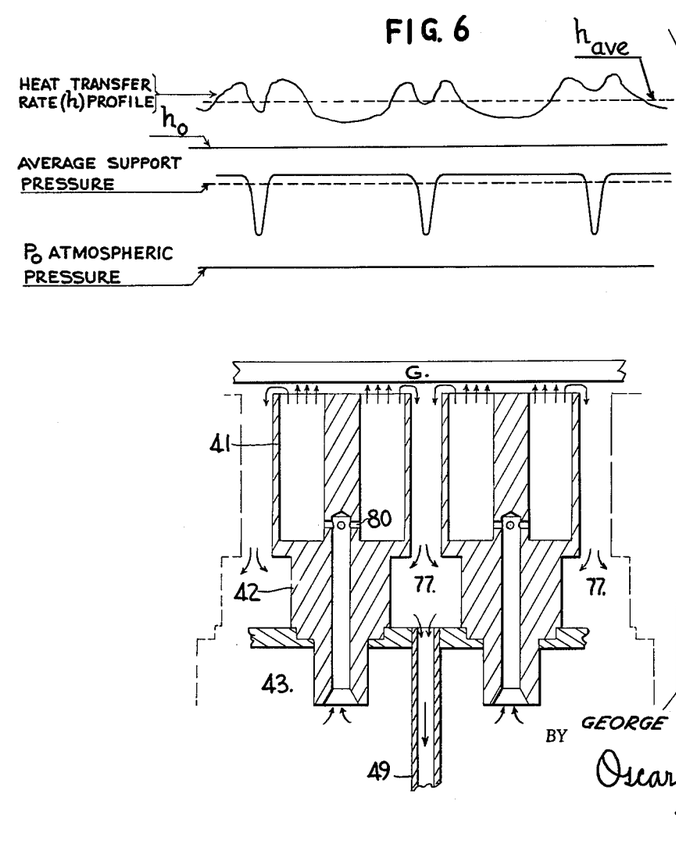
FIG. 6 is a schematic plan view taken along the lines 6—6 of FIG. 5 showing a section of a gas support module bed and diagrammatically indicating the flow and exhaust of the support gases and presenting diagrammatic graphs in conjunction therewith.
Figure 7:
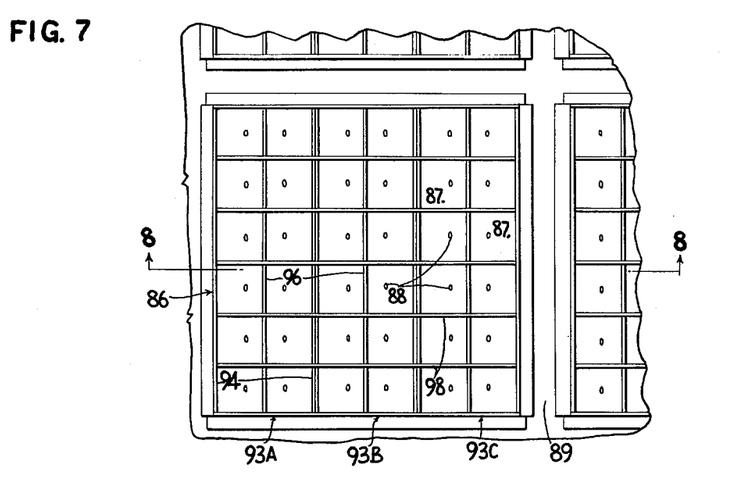
FIG. 7 is a partial plan view approximately full scale of a module bed illustrating another embodiment of a subdivided module.
Figure 13:
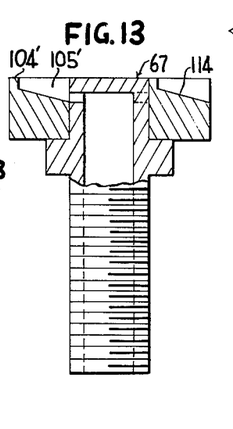
FIG. 13 is a section taken along lines 10—10 of FIG. 12.

The module embodiments illustrated in FIGS. 5–15, when assembled to form a module bed and suitably supplied with gas from a plenum chamber, provide the uniform pressure and turbulent flow of gas necessary for the desired high rates of heat transfer and uniformity of support for processing glass in the manner herein disclosed. The pressure profiles and heat transfer rate profiles characteristic of the module embodiments shown are schematically illustrated in FIGS. 5, 7 and 13 where the profiles are correlated with the module structure.

Pressure profiles across the outer terminus of a module may be determined in the following manner: A pressure sensing plate having a small hole therethrough is positioned above a module and spaced from the upper terminus thereof a distance corresponding to the height of a supported sheet, e.g., 0.010 inch. A pressure transducer is connected to the sensing hole and the electrical output of the pressure transducer is connected to a recorder which will graph pressure variations on one axis and displacement of the pressure sensing plate on the other axis. The pressure transducer controls the displacement of the recording device along, e.g., the Y axis of the graph. A potentiometer, the shaft of which is rotated by relative horizontal movement between the sensing plate and the module, translates such movement to an electrical signal which controls the displacement of the recording device along the other, or X axis, of the graph.

The heat transfer rate across the outer terminus of a module may be determined in the following manner: A plate, heated in a controlled manner and having a differential thermocouple attached centrally thereof and in heat sensitive, measuring relationship thereto, is positioned above a module and spaced from the upper terminus thereof a distance corresponding to the height of a supported sheet, e.g., 0.010 inch. Gas, at a known temperature and flow rate, is emitted from the module, creating a temperature differential in the heated plate by heat removal, to which the differential thermocouple is sensitive and in response to which it produces a differential thermoelectric potential proportional to the heat flow. This electrical output is connected to a recorder which graphs heat flow rate on one axis and displacement of the thermocouple on the other axis. The electrical output from the thermocouple controls the displacement of the recording device along, e.g., the Y axis of the graph. A potentiometer, the shaft of which is rotated by relative horizontal movement between the sensing plate and the module, translates such movement to an electrical signal which controls the displacement of the recording device along the other, or X axis, of the graph. Apparatus for determining the heat transfer is more fully described in the article Heat Transfer Between a Flat Plate and Jets of Air Impinging on It, International Developments in Heat Transfer, pages 454–460, 1961, published by The American Society of Mechanical Engineers.

As indicated by the embodiments depicted in FIGS. 5 to 14, each module forms an open-topped chamber essentially closed on its other sides and subdivided into a plurality of cavities or subchambers, each of which is individually supplied with gas from a plenum chamber. The upper terminus of each module defines a zone of substantially uniform pressure as diagrammatically shown in the profiles of FIGS. 6, 8 and 11 beneath the overlying or adjacent glass.

As indicated by the embodiment illustrated in FIGS. 5 and 6 of the drawings, the module 41 is subdivided into four cavities 41A, 41B, 41C and 41D, each of which is supplied with gas from a separate orifice 80 communicating with the plenum chamber 43 through hollow stem 42. Each cavity functions, in effect, as a submodule, and the pressure profile across the entire internal width of module 41 is substantially flat with the advantage that support is provided as the traveling workpiece covers any one submodule and before the entire unit is covered. The orifices 80 are so disposed to prevent direct impingement of pressurized gaseous fluid against the supported glass surface or the glass surface adjacent the upper terminus of the module so as to prevent dimpling of the glass from the velocity pressure of a localized jet of gas. They deliver the gas to the module in a path which is initially out of the path of the glass. As shown in FIG. 6, the intial path is toward the module sidewall below the upper edge thereof. However, the initial path may be downward or as a horizontal spiral or may be baffled or otherwise obstructed as long as it does not initially impinge against the glass. By feeding the support gas into the module subchambers through conduits or orifices which are smaller in cross section than the module subchamber, the gas diffuses into the gas of the subchamber producing a diffused flow, thus insuring uniform pressure across the upper edges of the module.

Most advantageously, the relatively small size of orifices 80 provides a drop in gas pressure from the interior of the plenum to the interior of each subdivision of the modules, and in so doing, performs three important functions: first, it prevents subdivisions of modules and entire modules not covered by the supported glass from allowing the rapid escape of gas from the common plenum, which would reduce the pressure in the plenum and, hence, in the covered modules; second, it prevents variations of load above a subdivision of a module from affecting the flow of gas from the plenum into the subdivision; and, third, it diminishes the effect of any slight variations in plenum pressure upon the pressure within the subdivisions of the module. With this arrangement, the gap between the upper terminus of the module and the lower surface of the supported glass becomes self-adjusting to a uniform size about the entire upper periphery of the module, which size is a function of the weight of the glass supported. This occurs because the flow of gas from the plenum through the module and to the exhaust area passes through two restrictions: the orifices 80 in the base of each submodule, and the gap between the upper terminus of the module and the supported glass. Because the gap is normally quite large with respect to the orifices 80, there will be a substantially constant pressure drop through the orifices from the plenum to the submodules. The pressure per unit area of cross section across each submodule is, under normal equilibrium conditions, equal to the weight per unit area of supported surface of the glass which it supports; the gap between the upper terminus of the submodule and the glass adjusting in size (i.e., changing the height of support of the glass from the module) until this pressure is obtained. Thus, if the gap becomes very small due to a heavy piece of glass or an external force upon the glass, the pressure within each affected submodule will increase until the pressure balances the load or until plenum pressure is reached as the gap approaches zero. If the gap diminishes to zero, there is, of course, insufficient pressure to support the load. The glass will be raised by the gas in each submodule impinging against the lower surface of the glass under any pressure in a submodule greater than the weight of the glass, thus increasing the size of the gap and reducing the pressure in the submodule. In this manner, the gap is self adjusting to a uniform size, dependent upon the weight of the glass, the plenum pressure and the size of the orifices. The rate at which the pressure within a submodule builds up with a decrease in the gap is a function of the rate of gas flow into the chamber and the volume of the chamber. Hence, the orifice must not be so small for a given plenum pressure as to restrict the flow of gas into each submodule to the extent that excessive time is required to increase the pressure in response to a decrease in support spacing. In most cases sufficient gas should enter the chamber within not more than one second, generally less than 0.1 second and preferably almost instantaneously to supply the required increased pressure necessary to prevent the glass from touching the uppermost module edge.

Submodules of small volume are more responsive for this purpose than are larger modules for a given flow rate. Generally, the submodules herein contemplated have a volume below 25 cubic inches, preferably not over about 10 cubic inches and most desirably less than 1 cubic inch. By forming the support bed from identically constructed modules and supplying them with uniform pressure, each module will support the overlying portions of the glass sheet or plate along a desired surface. The proximity of adjacent modules results in substantially uniform support under the entire area of the glass sheet to assure a product substantially free of distortion.

As shown in FIG. 6, the gas within each module escapes across the upper terminus of the module walls to zones of lower pressure between adjacent modules. This lateral flow of gas between the module wall and the glass results in a progressive pressure drop across the width of the wall. However, the resulting area of nonuniform support pressure directly above the wall thickness and the area of reduced pressure at the exhaust zones between the modules is minimized by utilizing thin module walls (rarely averaging greater than 3/8 inch) and relatively low gas flow which permits the exhaust areas between the modules to be kept small yet adequate to exhaust the gas without building up back pressure. This is shown by the module pressure profile of FIG. 5 wherein the dips shown in the pressure profile at the exhaust areas are sufficiently small to have no adverse effect on the moving supported material. Thus, a substantially uniform average support pressure is achieved, as shown in dotted line in FIG. 6.

Each module 41 of the embodiment shown in FIG. 6 is square and exhausts radially in all directions to the surrounding zones of lower pressure, resulting in the pressure profile shown. The pressure over the exhaust areas, while lower than the support pressure, generally is slightly above ambient pressure to provide a gas flow from the supported surface to the exhaust channel beneath the modules.

Figure 8:
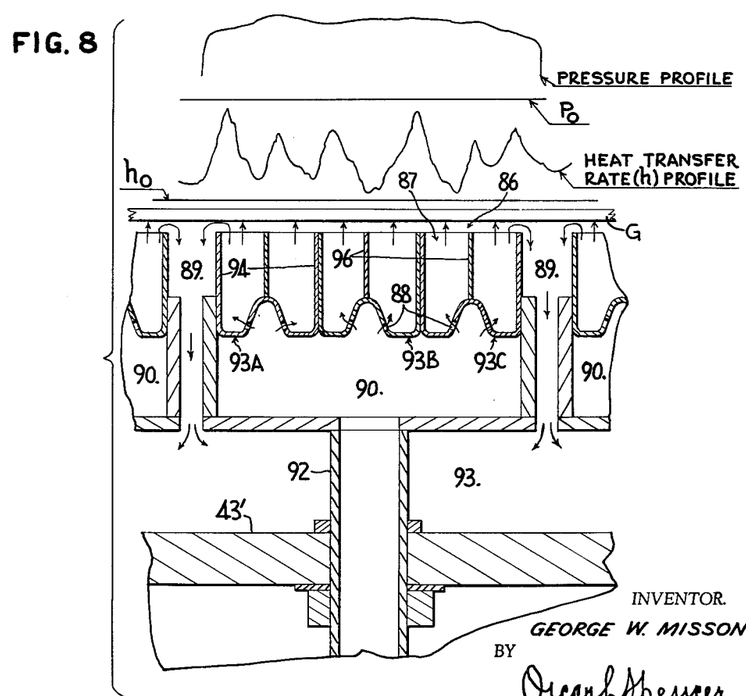
FIG. 8 is a schematic plan view taken along the lines 8—8 of FIG. 7 showing a section of a gas support module bed and diagrammatically indicating the flow and exhaust of the support gases and presenting diagrammatic graphs in conjunction therewith.

FIGS. 7 and 8 illustrate an additional embodiment of modules suitable for supporting a sheet of glass upon a film of gas at deformation temperatures of the glass and for providing a high rate of heat transfer between the gas and the supported or adjacent glass. As shown, a module 86 is formed of a plurality (thirty-six in the specific embodiment depicted) of small subdivisions 87 which are individually supplied with gas through orifices 88 from a common subplenum 90. A plurality of subdivided modules 86, including independent subplenums 90, are arranged in spaced but close juxtaposition, each to the other, to form a bed of modules in which the space 89 surrounding each module 86 forms an exhaust zone. Each subplenum 90 is supported above and in spaced relationship to the main supporting plenum 43' by a hollow stem 92 which communicates between the subplenum and the main plenum. In this manner, each subplenum 90 is supplied with gas under uniform pressure from a common plenum source. Continuous exhaust channels 93 beneath subplenums 90 and above common plenum 43' provide an adequate escape path for the flow of gas emitted from submodules 87 and exhausted downwardly away from the lower surface of the supported glass sheet through spaces 89 between adjacent modules. As in the previously described embodiment, the upper termini of submodules 87 are of rectangular configuration and lie in a common plane, and each row of modules 86 crossing the intended path of travel of the workpiece is at an angle other than 90 degrees with the path and spaced close to the next adjacent row.

For convenience and economy in assembly, the submodules 87 of module 86 are formed of three channels 93A, 93B and 93C opening upwardly as shown in FIG. 8 and with the longitudinally extending, inwardly located sidewall 94 of each outer channel 93A and 93C in contact with the adjacent side wall of the central channel 93B. Vertically disposed, longitudinally extending separator walls 96 extending parallel to sidewalls 94 subdivide channels 93 in a longitudinal direction into two equal, smaller channels. Transverse separators 98 are vertically disposed at right angles to separator walls 96 and spaced from each other longitudinally of channel 93 so as to further subdivide the channel into rectangular subdivisions of substantially equal size. The outer termini of separators 96 and 98 lie in a common plane defined by the outer termini of sidewalls 94 of channels 93. Each subdivided module 87 formed by channel sidewalls 94 and separator walls 96 and 98 communicates directly with subplenum 90 through at least one small orifice 88. Separator walls 96 and 98, channels 93, and the junctures therebetween are gas impervious so that each submodule 87 functions independently of the rest. The use of subplenums spaced from the main plenum by small stems 92 provides large exhaust areas close to the module outlets, an important feature on wide processing lines where otherwise a back pressure would develop in the central portions of the line, and yet provides, by way of the subplenums, a common source of pressurized gas in direct communication with the submodules.

The larger number of small subdivisions of modules 86 provides incremental support to an overlying glass sheet even though the entire module 86 is not covered. The relatively small volume of each submodule 87 provides a quick response of pressure buildup to variations in load at a relatively low rate of flow of support gas.

In operation, the rate of flow required to adequately support a given weight of glass is approximately one-third that needed with the modules shown in FIGS. 5 and 6. This is made possible by the smaller total exhaust area relative to the total support area, thereby providing a greater pressure for any given flow. In turn, the lower rate of flow assures that the smaller area of exhaust relative to support area will nevertheless be sufficient to prevent unacceptable doming of the deformable glass by a pressure buildup centrally of the support bed. The substantially flat pressure profile obtained is diagrammatically shown in FIG. 8. At the same time and at the same relatively low rates of flow, this module design provides a high rate of heat transfer between the adjacent sheet material and the gas. This is believed due to the enhanced turbulence created by the closely adjacent supply zones and the multitude of thin edges disposed at right angles to the sheet material being treated and across which the gas must flow as it passes in contact with the sheet. Where uniformity of support is not a major consideration, it will be evident that an increased flow of gas may be utilized to further increase the rate of heat transfer between the gas and the adjacent material. This concept may be utilized, for example, to rapidly raise the temperature of the glass sheet to slightly below its deformation temperature and thereafter reducing the flow to assure uniformity of support while the glass is further heated to a temperature above its deformation point. A heat transfer rate profile is diagrammatically illustrated in FIG. 8 of the drawings and depicts the effect that the outer termini of the submodule walls has upon the rate of heat transfer.

Figure 9:
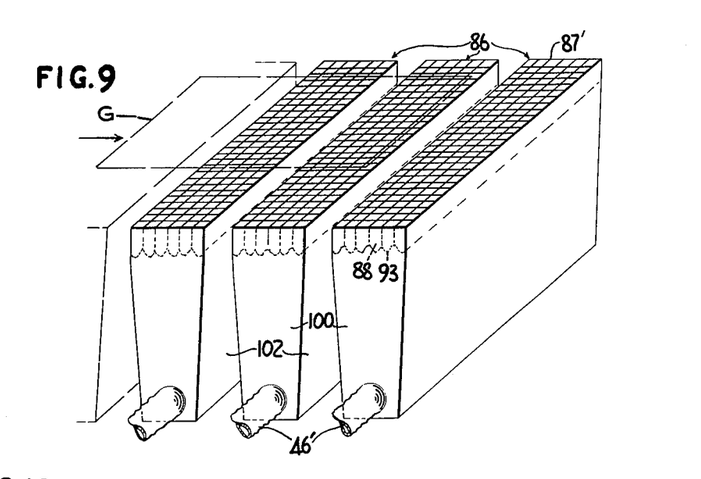
FIG. 9 is a schematic, perspective view of another embodiment of a subdivided module and schematically illustrates the relationship of plurality of modules forming a gas support bed.

A further modification of the above-described embodiment is illustrated in FIG. 9. In this embodiment, each module 86' extends across the entire width of the sheets being treated. The modules are divided into submodules 87' individually supplied with gas under pressure through orifices 88' from an independent plenum 100. Each plenum 100 is independently supplied with gas through flexible couplings 46', and each plenum 100 and module 86' is spaced along the path of intended travel from the next adjacent plenum and module so as to provide exhaust spaces 102 between adjacent modules and extending across the entire width of the intended path of travel, and preferably at an angle other than 90 degrees to the path of travel to assure maximum support of leading and trailing edges of glass sheets. Adequate support characteristics are assured by virtue of the independent functioning of the submodules 87', and, at the low flow rates utilized with this arrangement, the absence of exhaust spaces extending longitudinally of the path of travel creates little or no adverse pressure buildup centrally of the path of travel because of the adequate exhaust channels extending across the width thereof. Moreover, a very uniform heat transfer rate is attained transversely of the path of travel and the construction of the apparatus is substantially simplified. By virtue of the construction facilitated by the grouping of a large number of submodules together, as shown in the embodiments of FIGS. 7–9, it is possible to use thin material in forming the subdividers, resulting in modules having a low thermal inertia. Therefore, with these modules, it is possible to control and change temperatures of the supported material very quickly and accurately in response to changes in the gas temperature.

By way of comparison, it has been found that a sheet of glass can be supported at a given height above the upper termini of the modules of a module bed in the manner described herein when using the modules disclosed in FIGS. 7 and 8 or the modules disclosed in FIG. 9 at a flow rate of approximately ⅓ that required to so support the glass with modules of the type illustrated in FIGS. 5 and 6 of the drawings and the heat transfer rate at the reduced flow rate is at least equal to the heat transfer rate obtained at the higher flow rate used with the modules of FIGS. 5 and 6, other factors being equal. Conversely, if the flow rate is the same, the modules of FIGS. 7 and 8 will have a higher heat transfer rate. By way of a specific example, where a flow of gas at a rate of 290 cubic feet per minute at 1200 degrees Fahrenheit is emitted from a bed of modules of the type shown in FIGS. 5 and 6 spaced from the glass by a distance of 0.020 inch, the heat transfer rate has been found to be 47 British thermal units per hour per square foot of module bed per degree Fahrenheit. Under the same conditions, but using a bed of modules of the type shown in FIGS. 7 and 8, the heat transfer rate has been found to be 57 British thermal units per hour per square foot of module bed per degree Fahreinheit.

FIGS. 10 to 14 illustrate an embodiment of a module which has a particularly high heat transfer rate. The pressure profile, while acceptably flat, does not present as uniform a pressure as do the previously described module embodiments. For this reason, the module depicted in FIGS. 10 to 14 is most advantageously suited for use in quenching a heated sheet of glass to produce a very high degree of temper therein while still preserving the surface uniformity and optical characteristics of the heated glass sheet.

Figure 11:
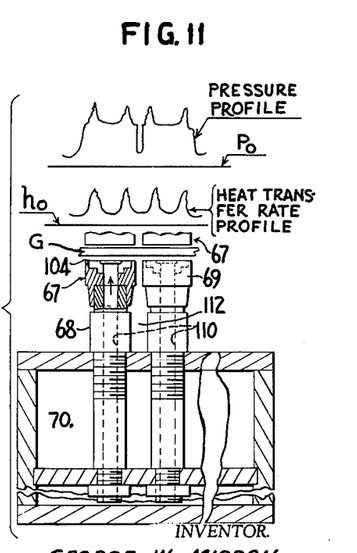
FIG. 11 is a schematic plan view taken along the lines 11—11 of FIG. 10 showing a section of a gas support module bed and diagrammatically indicating the flow and exhaust of the support gases and presenting diagrammatic graphs in conjunction therewith.
Figure 14:
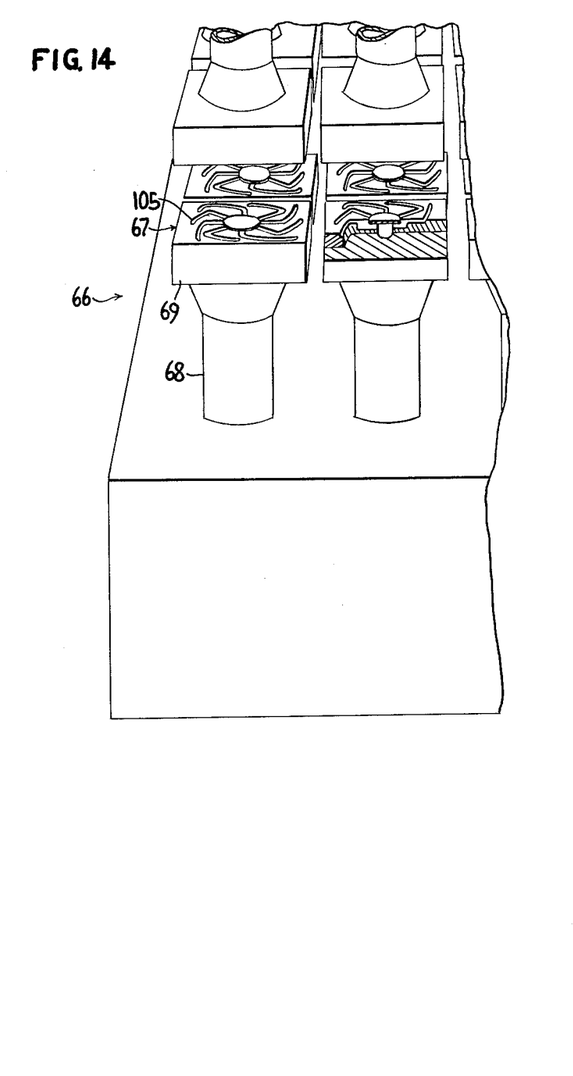
FIG. 14 is a partial, perspective view of an upper and lower module quench bed including the lower supporting plenum chamber and comprised of modules as shown in FIGS. 10 and 11, one of which is partially sectioned.

Each module 67 includes a prismatic body portion 69 having an end surface or, in the position of the module shown in FIGS. 11 and 14, an upper surface 104 of generally rectangular configuration and contains a plurality of coplanar, arcuate grooves 105 extending outwardly from a central part of the module at which location each groove communicates through a radial portion 107 with a central passageway 110 extending through the stem 68 and communicating with the plenum chamber 71. A fixed cap member 111 cooperates with radial groove portions 107 and central passageway 110 to form a restrictive orifice for each groove 105. With this arrangement, gas from the plenum is fed under pressure to the centermost portion of each arcuate subdivision of the module and flows along the arcuate subdivisions or grooves while escaping over the walls thereof and across the upper surface 104 of the module 67 to surrounding exhaust zones 112. When the module is in close proximity to a sheet of material, the pressure of the gas within the grooves 105 and adjacent the surface 104 exerts a force against the sheet capable of supporting the same. Turbulent flow is created by the constantly changing direction of the gas molecules caused by the arcuate path of grooves 105 as well as by the velocity increase caused by flowing from the grooves, across the edges thereof and into the space between the glass and the module surface 104. The result is an extremely high rate of heat transfer between the adjacent sheet of material and the flowing gas. A pressure support and heat transfer rate profile, each correlated with the module structure, are shown diagrammatically in FIG. 7.

Figure 10:
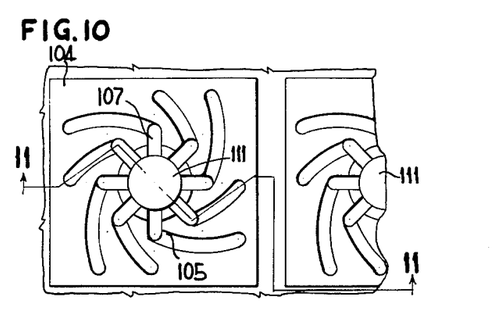
FIG. 10 is a partial plan view approximately full scale of a module bed illustrating another embodiment of a subdivided module primarily adapted for quenching glass sheets.

By way of comparison, it has been found that a given level of temper in a sheet of glass tempered between opposed module beds in the manner illustrated in FIG. 1 of the drawings and described herein may be obtained with the modules shown in FIGS. 10, 11 and 14 using no more than one-half as much air flow as required to achieve this level of temper with the modules shown in FIGS. 5 and 6 or with the quench modules disclosed in copending applications Serial Nos. 139,901 and 209,456 (e.g., in FIGS. 20 thereof), both assigned to the assignee of this application, all other conditions being the same. Conversely, it has been found that with the same gas flow rate a substantially higher level of temper (e.g., 40 percent higher center tension) can be achieved in a sheet of glass with the modules of FIGS. 10, 11 and 14 as compared with the other abovementioned modules. This substantial difference is illutrated by the experimental data set forth in the following table:

outer dimensions of approximately one inch and subdivided into four equal chambers as shown in FIG. 6

| Nozzle | Heat Transfer [1] | Spacing-Module to Glass Surface (inches) | | Air Flow [2] | | Temper Level $(m\mu/in.)$ [3] | Glass Sheet Thickness (inches) |
|---|---|---|---|---|---|---|---|
| | | Top | Bottom | Top | Bottom | | |
| Modules Shown in Fig. 10 Herein | 81 | .040 | .020 | 300 | 290 | 3,750 | 0.240 |
| | 184 | .043 | .035 | 1,225 | 1,170 | 6,920 | 0.242 |
| | 88 | .038 | .020 | 490 | 430 | 3,500 | 0.192 |
| | 184 | .035 | .023 | 1,275 | 1,180 | 5,950 | 0.192 |
| | 184 | .033 | .023 | 1,180 | 1,060 | 5,900 | 0.124 |
| Modules Shown in Fig. 20 of said Appln. Ser. Nos. 139,901 and 209,456 | 184 | .047 | .042 | 1,120 | 1,100 | 4,500 | 0.09 |
| | 120 | .043 | .023 | 1,000 | 800 | 4,100 | 0.240 |
| | 83 | .043 | .023 | 520 | 420 | 3,450 | 0.240 |

[1] British thermal units per square foot of module bed per degree Fahrenheit.
[2] Cubic feet per minute per square foot of module bed at ambient temperature (80°–100° F.).
[3] Center tension as indicated by the birefringent effect of the glass on polarized light waves expressed in millimicrons per inch of glass length as measured with a polariscope.

Figure 12:
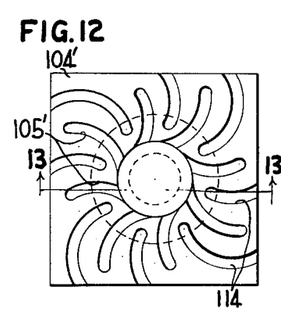
FIG. 12 is a plan view approximately full scale of another embodiment of a subdivided module suitable for establishing high rates of heat transfer.

There is shown in FIGS. 12 and 13 a module 67' similar to module 67 of FIGS. 10 and 11 but having arcuate exhaust grooves 114 in the upper surface 104' which are coplanar with the pressure grooves 105' to facilitate the exhaust or gases. While the pressure supply grooves 105' communicate with a source of gas under pressure centrally of the module and terminate short of the rectangular side walls thereof, as in the embodiment of FIGS. 7–9, additional exhaust grooves 114 are provided in modules 67' and are located between adjacent pressure grooves. Exhaust grooves 114 communicate at one end through the module side wall with the exhaust space 112 (FIG. 7) and terminate at the other end short of the central portion of the module. These grooves serve as exhaust zones interior of the periphery of the module 67' and receive gas emitted from the pressure grooves 105' before it flows to the surrounding area 112. Thus, direct conduits are provided between central portions of the module and exhaust zones 112 between adjacent modules. Grooves 105' and 114 are tapered longitudinally as shown in FIG. 11, to compensate for changes in the volume of gas present along the length of each groove. Thus, the pressure groove 105' decreases in depth from center to outer terminus because, as the gas flows along the groove, it also flows upwardly and out so that the entire volume does not traverse the entire length of the groove. Groove 114 is tapered in the opposite direction, that is, it increases in volume as it approaches the exhaust zone 112 to facilitate an increased volume in gases which have escaped from the pressure grooves and which must be carried to the module edges.

In all of the embodiments disclosed herein, the majority of the heat transfer between the gas flowing through the modules and the adjacent sheet of material is accomplished by convection through the flow of gas from the module to the exhaust area. Only a moderate amount of heat transfer takes place through conduction between the sheet material and the module through the gaseous medium to the module or through radiation between the sheet material and the module. By way of example, it has been found with the module embodiment shown in FIGS. 10 and 11, when used to quench a sheet of glass heated to a temperature below 1200 degrees Fahrenheit, that convective cooling accounts for upwards of 80 percent of the heat transfer from the glass at gas flow rates on the order of two standard cubic feet per minute per module. At higher flow rates, this percentage increases, whereas, at higher temperatures, radiation becomes more dominant in its contribution and the above percentage decreases.

The modules of the embodiments disclosed herein may vary in size, depending upon such considerations as the size of the glass sheets to be supported and the uniformity of support height desired along the dimensions of the supported glass. While square modules having outer dimensions of approximately one inch and subdivided into four equal chambers as shown in FIG. 6 or into eight equal arcuate grooves or subchambers as shown in FIGS. 10–14 have been found to be generally satisfactory for a large range of glass sheet sizes, the size of these modules may well vary in dimensions from about ⅛ to 2 or 3 inches on each side and need not be square, there being numerous other geometric or irregular shapes equally suitable. It will be evident that the module size of the embodiments shown in FIGS. 7–9 may also vary and that the module shown in FIG. 9 is designed to extend across the entire width of the conveying path. Subdivisions of these modules of approximately ¼ inch across have been found to be satisfactory for a large range of glass sheet sizes. To achieve satisfactorily uniform support characteristics for sheets of glass or other sheet material heated to a deformation temperature, the distance across the upper terminus of each submodule forming the support bed should be no more than ½ of the correspondingly oriented dimension of the supported sheet and preferably should be less than ⅕ thereof. The module depth from the bottom to the outer terminus may vary, but for best support characteristics must be substantial. Normally, it will be at least 1/16 inch deep and in most cases, except in the embodiments of FIGS. 10–14, ¼ to 1 inch or more.

OPERATION

In operation, sheets of glass are placed seriatim upon rolls 20 of the apron roll unit 15 with a longitudinally extending edge abutting guide collars 23 and are conveyed by the rotation of rolls 20 through the preheat section 11 where they are heated from ambient temperature to a temperature just below that at which they will deform to the contour of the supporting force. At the end of the preheat section the glass sheets are conveyed onto the module bed 40 of the heating section 12. Hot products of combustion introduced into the plenum chambers 43 provide fluid support as well as heat to the lower surface of the glass sheets, and heating coil units 34 supply heat above the glass sheets to balance that supplied by the supporting gas below to prevent heat warpage and an accompanying loss in uniform support. The glass sheets abut the inner peripheries of disc driving members 47 which frictionally engage a longitudinally extending edge of the glass sheet by virtue of the angular disposition of the module beds 40 transversely of the predetermined path of travel. The temperature of the hot products of combustion is normally maintained constant and slightly above the desired final temperature of the glass. For a tempering process, the gas temperature is generally maintained at approximately 1200 degrees Fahrenheit to assure that the glass sheets attain a sufficiently high temperature for effective tempering. The module bed 40 may be made up of the modules disclosed in FIG. 5 or alternatively those disclosed in FIGS. 7 to 9, 10 and 11, 12 and 13, or 14 and 15.

In the quenching section, air at ambient temperature is supplied to upper and lower plenum chambers of the head assembly 74 and lower air support module bed 66 and is impinged upon both major surfaces of the glass sheets to uniformly temper the glass while it is suspended between the opposing flows. The modules shown in FIGS. 10–14 are preferred for tempering. Drive discs 470 convey the glass by edge contact. Uniformity of heat transfer is assured by the uniform diffused flow of gas from the module beds of the heating and quenching sections, thereby minimizing deformation of an iridescent stress pattern in the tempered glass.

After the glass is cooled to approximately 600 degrees Fahrenheit in the quenching section and is no longer deformable, it is conveyed from the air support to the rolls 200 of the delivery section 14 and thence to their next destination.

OTHER EMBODIMENTS

While in the foregoing description illustrative embodiments of this invention have been disclosed, in many instances it is possible to alter the constituents or substitute equivalents therefor to obtain substantially the same results in substantially the same way.

For example, in the embodiments shown, a specific number of subdivisions or submodules grouped together in the form of a module has been disclosed. It will be readily apparent that the specific number of subdivisions as well as their specific configuration and arrangement may be varied without substantially affecting the functional characteristics thereof. The module sizes and the pressures and flow rates used therewith will of course vary with the sizes and materials of the sheets treated and with the quality that is desired in the end product. Other fluids than hot products of combustion or ambient air may be used with the modules disclosed. In addition, the apparatus may be used for other than heating or cooling sheet material; for example, it may be used for supporting and conveying sheet material already heated or it may be used for heating or cooling objects or materials other than in sheet form; for example, for cooling machinery or other equipment placed in close proximity to the outer termini of modules arranged to conform to the surface being cooled.

Of course, the heat transfer characteristics of the modules disclosed herein may be utilized for heating and cooling glass sheets without supporting the sheets on the gaseous flow. Opposed module beds may be vertically positioned and glass sheets or other sheet material may be conveyed by conventional tong supports between the beds for heating and tempering.

It should be evident from the above that, while in the foregoing disclosures certain preferred embodiments of the invention have been disclosed, numerous modifications or alterations may be made therein without departing from the spirit and scope of the invention as set forth in the appended claims.

What is claimed is:

1. Apparatus for emitting a flow of gas comprising a prismatic body, a central cavity beneath one surface of said body, a plurality of spaced grooves in said one surface curved in the plane of said surface and extending outwardly from the projection of said central cavity on said surface, and a restrictive orifice between said central cavity and each groove.

2. Apparatus of claim 1 wherein the grooves and central cavity are in the general form of a whorl.

3. Apparatus for supporting sheet material upon a flow of gas and transferring heat therebetween, including a plurality of adjacent gas outlets each of which is subdivided into a plurality of substantially coplanar grooves extending generally outwardly from a central source of gas under pressure, the upper termini of the walls of said grooves lying along a common generative surface; means to separately supply a plurality of gas outlets with gas under pressure from a common source; and spaces between said adjacent gas outlets at said generative surface to provide channels for a flow of gas emitted from said outlets.

4. The apparatus of claim 3 including exhaust grooves between and substantially coplanar with the grooves into which the gas outlets are subdivided, said exhaust grooves communicating with said channels.

5. In a method of heat transfer wherein gas is directed against a sheet to be subjected to such transfer through a plurality of spaced outlets and wherein the gas at a temperature different from that of the sheet flows in contact with the sheet between said outlets and the sheet, the improvement which comprises directing a plurality of streams of the gas from source points in said outlets in directions which are substantially parallel to and along the surface of said sheet opposite said outlets, changing the direction of each of said streams at a point spaced from the source thereof to another direction substantially parallel to and along said surface, and supplying enough of said gas to said streams to cause the streams to overflow the outlets and contact the sheet surface.

6. Apparatus for transferring heat between gas and a sheet wherein gas is directed against a sheet to be subjected to such transfer comprising a plurality of adjacent gas outlets each of which is subdivided into a plurality of channels extending generally outwardly from a central source of gas under pressure, each of said channels having side walls terminating in a common generative surface and forming an opening in said surface along the termini of said side walls; means to supply a plurality of said gas outlets and said channels with a flow of gas from a source; and exhaust spaces between adjacent gas outlets and adjacent said generative surface to provide for a flow of gas emitted from said outlets to said spaces, the direction of each of said channels changing at a point spaced from said source.

References Cited by the Examiner

UNITED STATES PATENTS

| | | | |
|---|---|---|---|
| 756,600 | 4/1904 | Dodge | 214—1 |
| 820,205 | 5/1906 | Keighley | 65—176 |
| 1,622,817 | 3/1927 | Waldron | 65—182 |
| 2,042,610 | 6/1936 | Littleton | 65—114 |
| 2,848,820 | 8/1958 | Wallin et al. | 214—1 |
| 3,048,383 | 8/1962 | Champlin | 65—182 X |
| 3,062,520 | 11/1962 | Frey et al. | 65—182 X |
| 3,069,965 | 12/1962 | Strzala. | |

FOREIGN PATENTS 1,149,169   7/1957   France.

DONALL H. SYLVESTER, *Primary Examiner.*

MORRIS O. WOLK, *Examiner.*